United States Patent
Henry et al.

(10) Patent No.: US 9,762,895 B1
(45) Date of Patent: Sep. 12, 2017

(54) DUAL SIMULTANEOUS IMAGE PRESENTATION FOR A THREE-DIMENSIONAL AVIATION DISPLAY

(71) Applicant: Rockwell Collins, Inc., Cedar Rapids, IA (US)

(72) Inventors: Daniel J. Henry, Cedar Rapids, IA (US); Donald E. Glass, Cedar Rapids, IA (US); Matthew J. Cunnien, Marion, IA (US); Max G. Taylor, Hiawatha, IA (US); Michael J. Armstrong, Central City, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 286 days.

(21) Appl. No.: 14/500,234

(22) Filed: Sep. 29, 2014

Related U.S. Application Data

(60) Provisional application No. 61/951,050, filed on Mar. 11, 2014.

(51) Int. Cl.
| | |
|---|---|
| *G01C 21/26* | (2006.01) |
| *H04N 5/33* | (2006.01) |
| *G01S 17/89* | (2006.01) |
| *G06T 19/00* | (2011.01) |
| *H04N 13/04* | (2006.01) |
| *B64D 45/00* | (2006.01) |
| *B64D 43/00* | (2006.01) |

(52) U.S. Cl.
CPC ......... *H04N 13/0436* (2013.01); *B64D 43/00* (2013.01); *B64D 45/00* (2013.01); *H04N 13/044* (2013.01); *H04N 13/0468* (2013.01); *H04N 13/0484* (2013.01); *H04N 13/0497* (2013.01)

(58) Field of Classification Search
None
See application file for complete search history.

(56) References Cited

U.S. PATENT DOCUMENTS

| | | | |
|---|---|---|---|
| 6,219,444 B1 * | 4/2001 | Shashua | G06T 15/205 345/424 |
| 8,199,186 B2 * | 6/2012 | Florencio | H04N 13/0014 348/42 |
| 2003/0184602 A1 * | 10/2003 | Kuroki | G02B 27/017 715/856 |
| 2010/0060511 A1 * | 3/2010 | Nouvel | G01C 23/00 342/29 |
| 2010/0231705 A1 * | 9/2010 | Yahav | G02B 27/01 348/115 |

(Continued)

*Primary Examiner* — Reza Aghevli
(74) *Attorney, Agent, or Firm* — Angel N. Gerdzhikov; Donna P. Suchy; Daniel M. Barbieri

(57) ABSTRACT

A system is disclosed which utilizes a three-dimensional (3D) display system, in combination with an avionics Synthetic Vision System (SVIS), to provide 3D synthetic images of scenes around an aircraft where the systems are dynamically modified to meet particular needs of a flight crew, depending upon variable characteristics of the aircraft and environment including: phase of flight of the aircraft; attitude of the aircraft; proximity of the aircraft to Degraded Visual Environment (DVE) conditions; whether the 3D display system is an head-down display (HDD) or an immersive head-mounted display (HMD); and whether the 3D display system is an head-up display (HUD) or an HMD with a transparent visor.

20 Claims, 3 Drawing Sheets

(56) References Cited

U.S. PATENT DOCUMENTS

| | | | |
|---|---|---|---|
| 2011/0196598 A1* | 8/2011 | Feyereisen | G01C 21/00 701/120 |
| 2011/0210871 A1* | 9/2011 | Flotte | G01C 23/00 340/961 |
| 2013/0002454 A1* | 1/2013 | Burns | G01C 23/00 340/975 |
| 2013/0257852 A1* | 10/2013 | Meeker | G01C 23/00 345/419 |
| 2013/0261854 A1* | 10/2013 | Feyereisen | G01C 23/00 701/16 |
| 2014/0309915 A1* | 10/2014 | Beda | G08G 5/065 701/120 |
| 2014/0331161 A1* | 11/2014 | Venkataswamy | G06F 3/0484 715/771 |

* cited by examiner

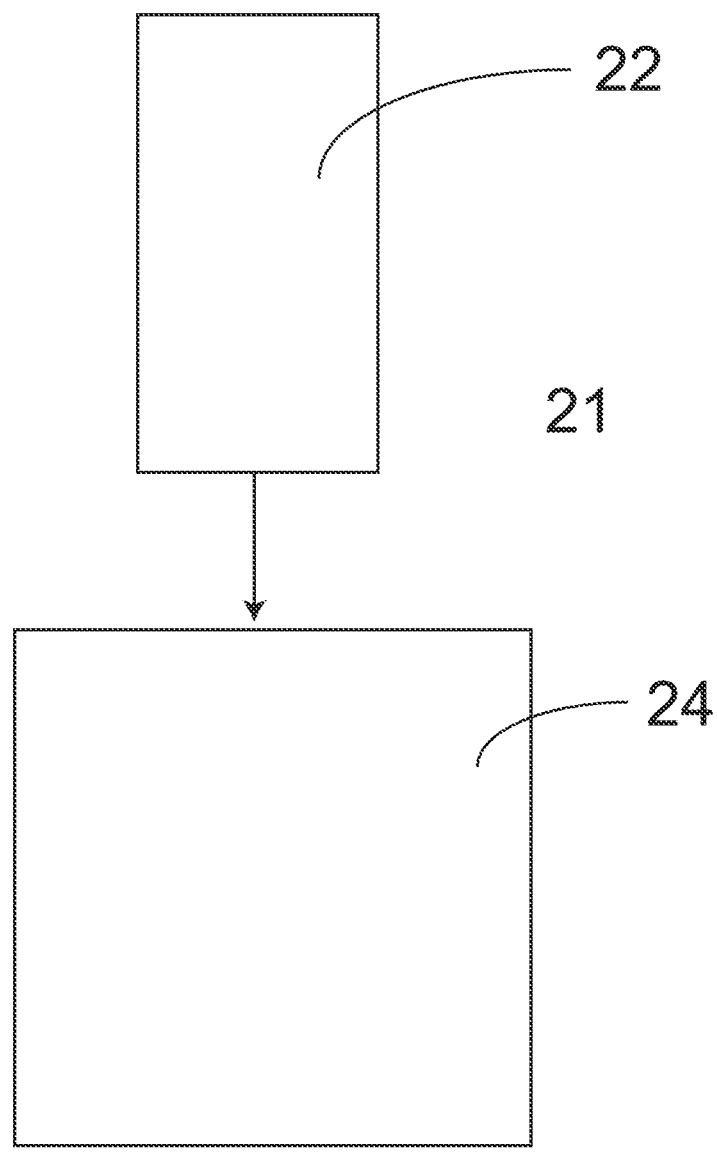

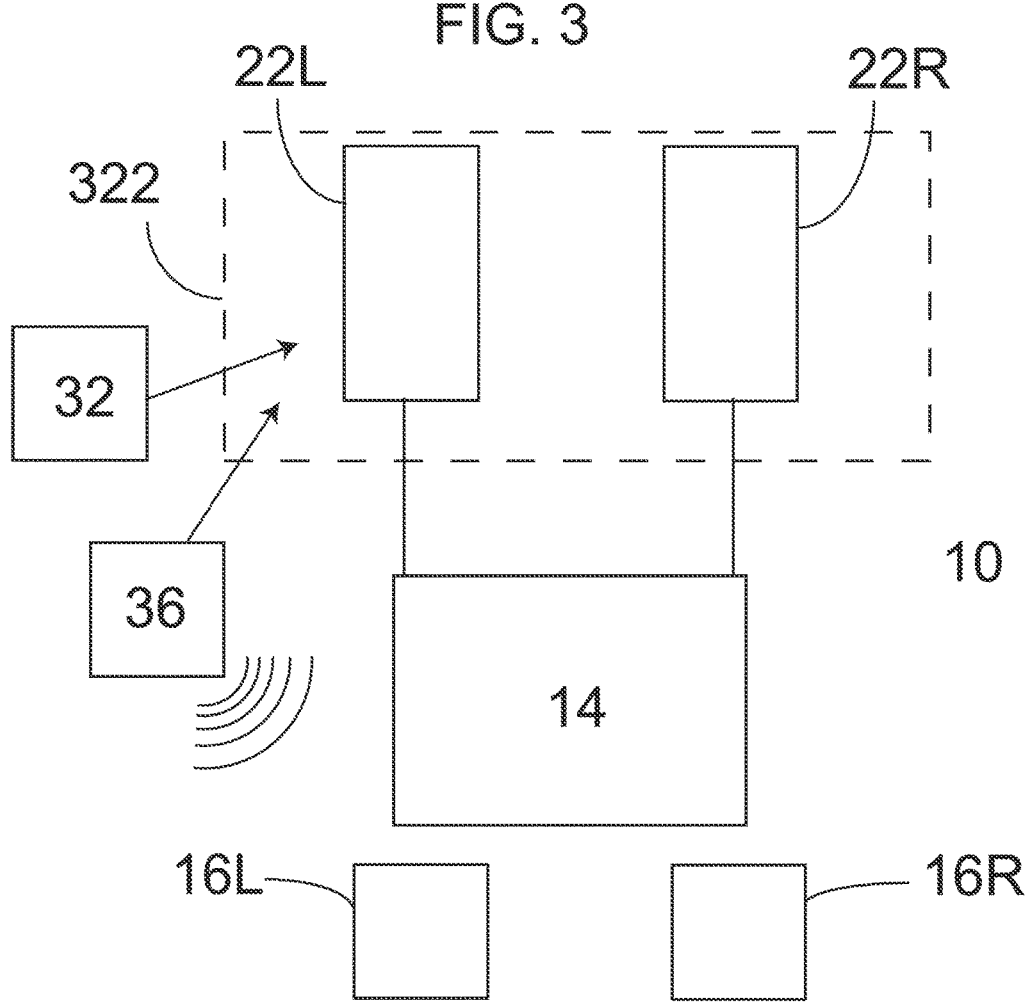

DUAL SIMULTANEOUS IMAGE PRESENTATION FOR A THREE-DIMENSIONAL AVIATION DISPLAY

PRIORITY

The present application claims priority under 35 U.S.C. §119(e) to U.S. Provisional Patent Application Ser. No. 61/951,050, titled Aviation and Defense Display Systems, By Daniel J. Henry et al., filed Mar. 11, 2014, is an application of which currently co-pending application(s) are entitled to the benefit of the filing date. The above-referenced provisional patent application is hereby incorporated by reference in its entirety.

FIELD OF THE INVENTION

The present invention generally relates to aviation and defense displays.

BACKGROUND OF THE INVENTION

In the past, it has been known to provide three dimensional (3D) video images for consumer television and other applications. The hardware for such 3D video images is well known and typically involves substantially identical left and right video image channels of the same scene, except that they are taken from different lateral positions often separated by a few inches, yielding slightly different images so as to mimic views from each of a person's eyes. Both of the video image channels are often sent to a 3D processor where they are electronically converted into 3D display drive signals for a single 3D display device, such as a 3D flat screen television display. The viewers will usually look at the 3D display through special glasses or Fresnel lenses, which allow each video image channel to effectively reach one eye only. This results in two slightly different images projected on to the retinas of the viewer's eyes. Then the viewer's visual cortex of the brain processes the binocular disparities of the two video image channels together in a way that permits 3D, or stereoscopic depth perception, that would otherwise be impossible with 2D displays. Many variations of the systems and methods of this general system, the 3D processor, Fresnel lenses and the special glasses, are well known in the industry and need not be explained to a person skilled in the art.

Synthetic Vision Systems (SVIS) have been proposed where the SVIS gives the pilot a synthetic (computer generated) view (on a flat panel 2D display) of topography that would be seen from a single point within the cockpit. In addition, weather information and other air traffic may be shown on the SVIS displays. It has been proposed that SVIS will allow pilots to essentially fly 'visual' approach procedures, even in adverse weather.

While these SVIS systems provide enhanced situational awareness in times of poor visibility, they are lacking in the availability of providing a 3D perspective.

Consequently, there exists a need for improved methods and apparatuses for enhancing vision and situational awareness in an aviation setting.

SUMMARY OF THE INVENTION

It is an object of the present invention to provide a 3D SVIS.

It is a feature of the present invention to utilize known commercial hardware for 3D display in an SVIS system.

It is an advantage of the present invention to enable visual cortex integration of disparate input video channels in an SVIS to provide a stereoscopic 3D display.

It is another advantage of the present invention to cost effectively provide a 3D SVIS.

It is still another feature of the present invention to provide dynamically variably disparate line of sight (LOS) paths as input into the SVIS projections as a function of phases of flight and environmental conditions, especially under Degraded Visual Environment (DVE) conditions.

The present invention is an apparatus and method for providing 3D, or improved perspective SVIS, which is designed to satisfy the needs mentioned above, provide the previously stated objects, include the above-listed features, and achieve the advantages explained above. Accordingly, one embodiment of the present invention is directed to a method of providing two disparate perspectives of an SVIS image where each perspective is provided to a single eye.

Additionally, the present invention is a system for increasing situational awareness of a flight crew member on an airborne aircraft, comprising: an SVIS scene signal generating system, which is configured to simultaneously generate two 2D SVIS scenes for two lines of sight (LOS); a 3D display system configured to provide different 2D images to each eye of a person so that a combined image can be perceived.

BRIEF DESCRIPTION OF THE DRAWINGS

The invention may be more fully understood by reading the following description of the preferred embodiments of the invention, in conjunction with the appended drawing wherein:

FIG. 2 is a block diagram illustrating a simplified SVIS of the prior art.

FIG. 3 is block diagram of a 3D SVIS of the present invention.

DETAILED DESCRIPTION

Figure 1:
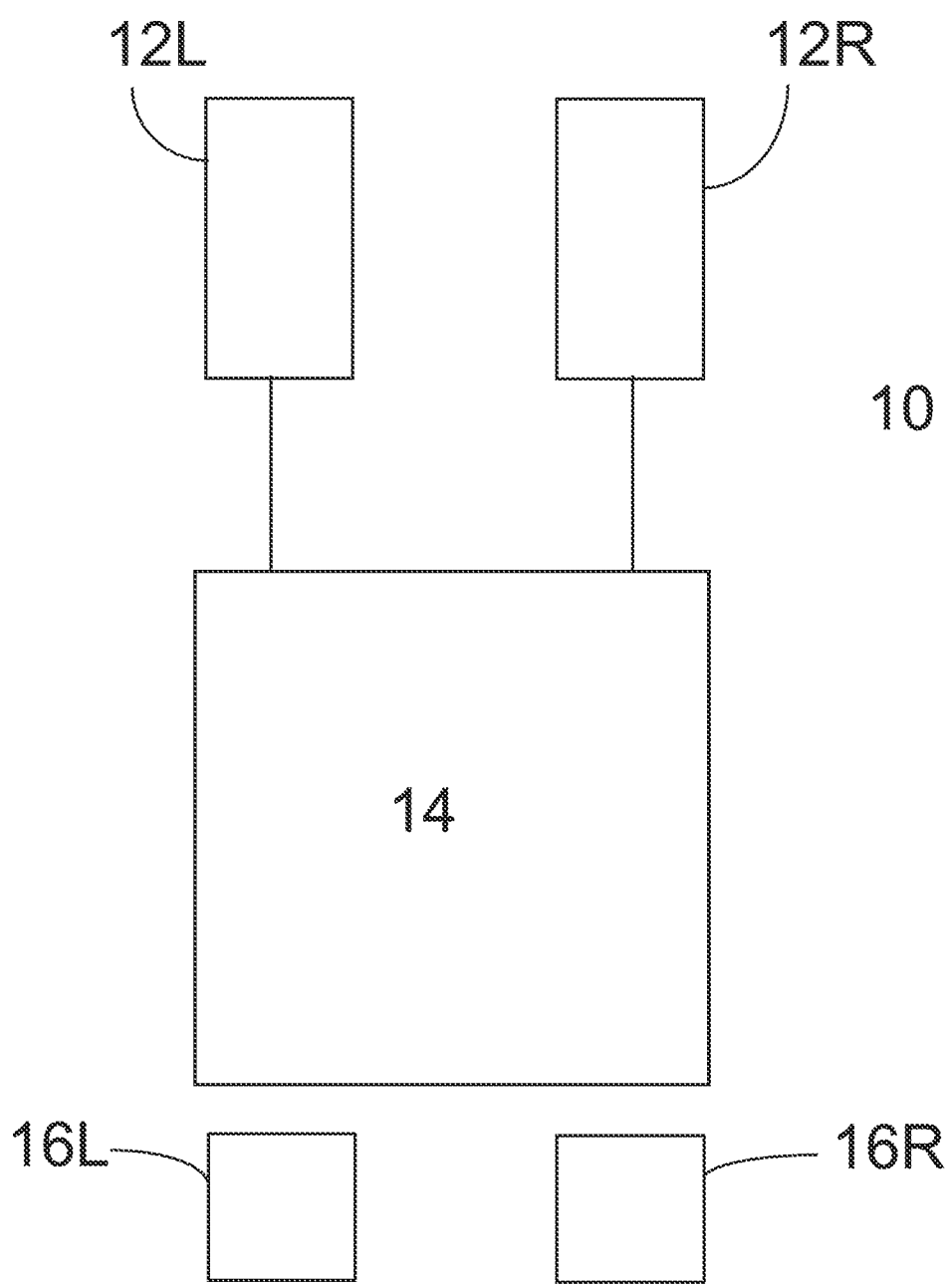
FIG. 1 is a block diagram illustrating a simplified 3D video system of the prior art.

Now referring to the Figures where like numerals refer to like matter throughout, and more particularly referring to FIG. 1 where there is shown a 3D display system of the prior art, generally designated 10, comprising a left video image channel 12L and a right video image channel 12R. These left and right video image channels may be two identically constructed video cameras, each outputting a live stream of data representative of a scene taken from a unique perspective. The box labeled 14 could be the remaining entirety of a 3D display system, i.e. 3D system accepts the streams of data from the two video image channels and presents such video image channels to the eyes 16L and 16R of a human viewer.

Although described with particular reference to a 3D display, such as a 3D television, the system and method for providing different images to each eye of a viewer can be used in any device or system that provides independent image channels. The 3D display system 14 could be constructed in a myriad of configurations depending on the many different types of 3D displays. Many of these prior art 3D display systems 14 have improved much in recent years. The advent of consumer 3D television has resulted in a significant reduction in the cost of such flat panel systems. 3D imaging has been proposed in numerous, more critical applications, such as medicine, manufacturing, construction, etc. These more demanding applications have their own variations of 3D display systems and 3D display system 14 is intended to include all such prior art 3D display systems. 3D display system 14 shall be construed herein to specifically include: 3D head down displays (HDD), 3D head mounted displays (HMD) with transparent visors, immersive 3D HMD (with non-transparent visors) and 3D head up displays (HUD) are examples of such more demanding prior art 3D display systems.

Now referring to FIG. 2 there is shown an SVIS system of the prior art generally designated 21 including a SVIS scene signal generating system 22 which provides a computer generated scene signal, which is analogous to a video image signal output by 12L or 12R of FIG. 1. 2D display system 24 represents the various system components which take the computer generated scene signal and provide something which is perceivable by the eyes 16L and 16R as a 2D image of a computer generated 3D space in front of an aircraft. Numerous SVIS scene signal generating systems have been proposed in the past, including systems that are able to generate a myriad of different lines of sight (LOS) from a database representative of topography, obstacles, traffic or weather etc. in a 3D space in front of an aircraft These LOS can be dynamic, such as being responsive to the attitude of aircraft. System 22 is intended to include all such prior art SVIS systems.

Now referring to FIG. 3, the system and method of the present invention for enhanced and 3D SVIS can be implemented utilizing the following systems and methods. SVIS scene signal generating system 322 may be very similar to prior art SVIS scene signal generating systems 22 of the prior art, except for the ability to simultaneously generate two independent LOS and to be responsive to external dynamic input 32, which provide information to control system 322, such as whether there are Degraded Visual Environment (DVE) conditions, attitude of the observer with respect to the scene, phase of flight, speed, altitude, location, etc. SVIS scene signal generating system 322 may also be responsive to input from head/eye tracking system 36. One of the novel aspects of the present invention is to display to the flight crew member a 3D SVIS scene in any (360 degree) direction which is defined by either a head tracking system, an eye tracking system or a combined head/eye tracking system. System 322 is shown having two independent video image channel sources 22L and 22R which correspond to LOS through a geographic database, which could be viewed as being a virtual camera. The LOS and the interpupillary distance (IPD) for each of the 22L and 22R could be dynamically variable depending upon external input, such as head/eye tracking system outputs, DVE conditions, attitude of the observer with respect to the scene in front of an aircraft, phases of flight (take-off, enroute, approach, landing), location, speed, altitude, etc. This dynamically variable stereo vision, hyperstereo vision and ultrahyperstereo vision is believed to be new in an SVIS environment. One feature of the present invention is to create for pilots an alert feature which suggests a sense of urgency of an object where the range in front of the aircraft is close and rapidly decreasing. When the present system has a large IPD on the order of 90 inches, objects which approach the pilot's location appear to pop out of the screen and thereby create an effective alert of the urgency of responding to such objects or threats. When the term "means for creating a mental urgency alert" are used herein, it should be understood that this refers to the system of FIG. 3 where the 22L and 22R are for LOS with large IPD. The amount of separation needed to create the "popping out affect" to create these alerts may be dependent upon individual factors unique to each pilot, but IPD at least one order of magnitude larger than normal may be sufficient.

Throughout this discussion, the two different scenes are described as being representative of differing IPD, however it should be understood that the scenes could be a forward LOS and an exocentric view presented in stereo for the cerebral cortex to process.

It is thought that the method and apparatus of the present invention will be understood from the foregoing description and that it will be apparent that various changes may be made in the form, construct steps and arrangement of the parts and steps thereof without departing from the spirit and scope of the invention or sacrificing all of their material advantages. The form herein described is merely a preferred exemplary embodiment thereof.

The invention claimed is:

1. A system for increasing situational awareness of a flight crew member on an airborne aircraft, comprising:
   a Synthetic Vision System (SVIS) scene signal generating system, which is configured to simultaneously generate a different two-dimensional (2D) SVIS scene for each of two different lines of sight (LOS); and
   a three-dimensional (3D) stereoscopic display system configured to provide a different 2D image generated from one of the two 2D SVIS scenes to each eye of a person, wherein situational awareness of the person is increased when the two 2D SVIS scenes are combined into a 3D image.

2. The system of claim 1, wherein said two 2D SVIS scenes are representative of two LOS of the person and are obtained from two independent video channel sources having an interpupillary distance (IPD), the two independent video channel sources corresponding to the two LOS through a geographic database.

3. The system of claim 2, wherein said IPD is a first IPD, and wherein said two independent video channel sources have a second IPD, the second IPD being at least one order of magnitude larger than said first IPD.

4. The system of claim 1, wherein said two 2D SVIS scenes include an exocentric scene and a forward looking scene from a perspective of the person in an aircraft.

5. The system of claim 1, wherein said SVIS scene signal generating system is responsive to input chosen from one of: phase of flight information, a detected degraded visual environment (DVE) condition, eye tracking system output data, head tracking system output data, attitude of an aircraft, and speed of an aircraft.

6. The system of claim 1, wherein said SVIS scene signal generating system is responsive to eye tracking system output data or head tracking system output data, said 3D stereoscopic display system is a 3D head-mounted display (HMD) with a transparent visor, and said two LOS are representative of an IPD unless a DVE condition is detected.

7. The system of claim 6, wherein the IPD is a first IPD, the system further comprising:
   means for creating a mental urgency alert, wherein the first IPD is at least an order of magnitude smaller than a second IPD, and wherein the mental urgency alert is provided and the two LOS are representative of the second IPD when the DVE condition is detected.

8. The system of claim 1, wherein said 3D stereoscopic display is a head-up display (HUD) and said SVIS scene signal generating system generates a second two 2D scenes from a second two LOS, said second two LOS being representative of a first IPD until a DVE condition is detected, thereafter the second two LOS are representative of a second IPD that is an order of magnitude larger than the first IPD.

9. A method of increasing situational awareness of a member of a flight crew on an aircraft comprising the steps of:
generating a different 2D SVIS scene for each of two different LOS using an EVS or SVIS scene signal generating system; and
generating a different 2D image from each one of the two 2D EVS or SVIS scenes to provide a different image to each eye of a member of a flight crew using a 3D display system, wherein situational awareness of the member of the flight crew is increased when the two 2D images are combined into a 3D image.

10. The method of claim 9, wherein the two LOS are characterized by an IPD and a convergence angle.

11. The method of claim 10, wherein said IPD is a first IPD and said convergence angle is a first convergence angle, wherein the two LOS are characterized by a second IPD and a second convergence angle when an adverse external dynamic input including a DVE condition is detected.

12. The method of claim 10, wherein said IPD and convergence angle are dynamically variable.

13. The method of claim 12, wherein said IPD and convergence angle are dynamically variable based upon a characteristic of an aircraft.

14. The method of claim 13, wherein said characteristic is selected from one of:
phase of flight of the aircraft, attitude of the aircraft proximity of the aircraft to DVE conditions, a detection that the 3D display system is a head-down display (HDD) or an immersive HMD, and a detection that the 3D display system is an HUD or an HMD with a transparent visor.

15. A system, comprising:
an Enhanced Vision System (EVS) scene signal generating system configured for simultaneously generating a 2D EVS scene for each of two different LOS; and
a 3D display configured to present a 3D image for increasing situational awareness, the 3D image generated by providing a different image to each eye of a member of a flight crew, wherein each image provided to each eye is based upon a different one of the two different LOS.

16. The system of claim 15, wherein the two different LOS are two independent LOS that are characterized by an IPD and a convergence angle.

17. The system of claim 16, wherein said IPD is a normal IPD and said convergence angle is a convergence angle corresponding to said IPD.

18. The system of claim 16, wherein said IPD and convergence angle are dynamically variable.

19. The system of claim 18, wherein said IPD and convergence angle are dynamically variable based upon a characteristic of an aircraft.

20. The system of claim 19, wherein said characteristic is selected from one of:
phase of flight of the aircraft, attitude of the aircraft, proximity of the aircraft to DVE conditions, whether the 3D display system is an HDD or an immersive HMD, and whether the 3D display system is an HUD or an HMD with a transparent visor.

* * * * *